Oct. 21, 1924.
C. E. FISHER
1,512,588
BRUSH MAKING MACHINE
Filed June 21, 1921.
16 Sheets-Sheet 2

Inventor
Charles E. Fisher
By Robert H. Wilson
Attorney

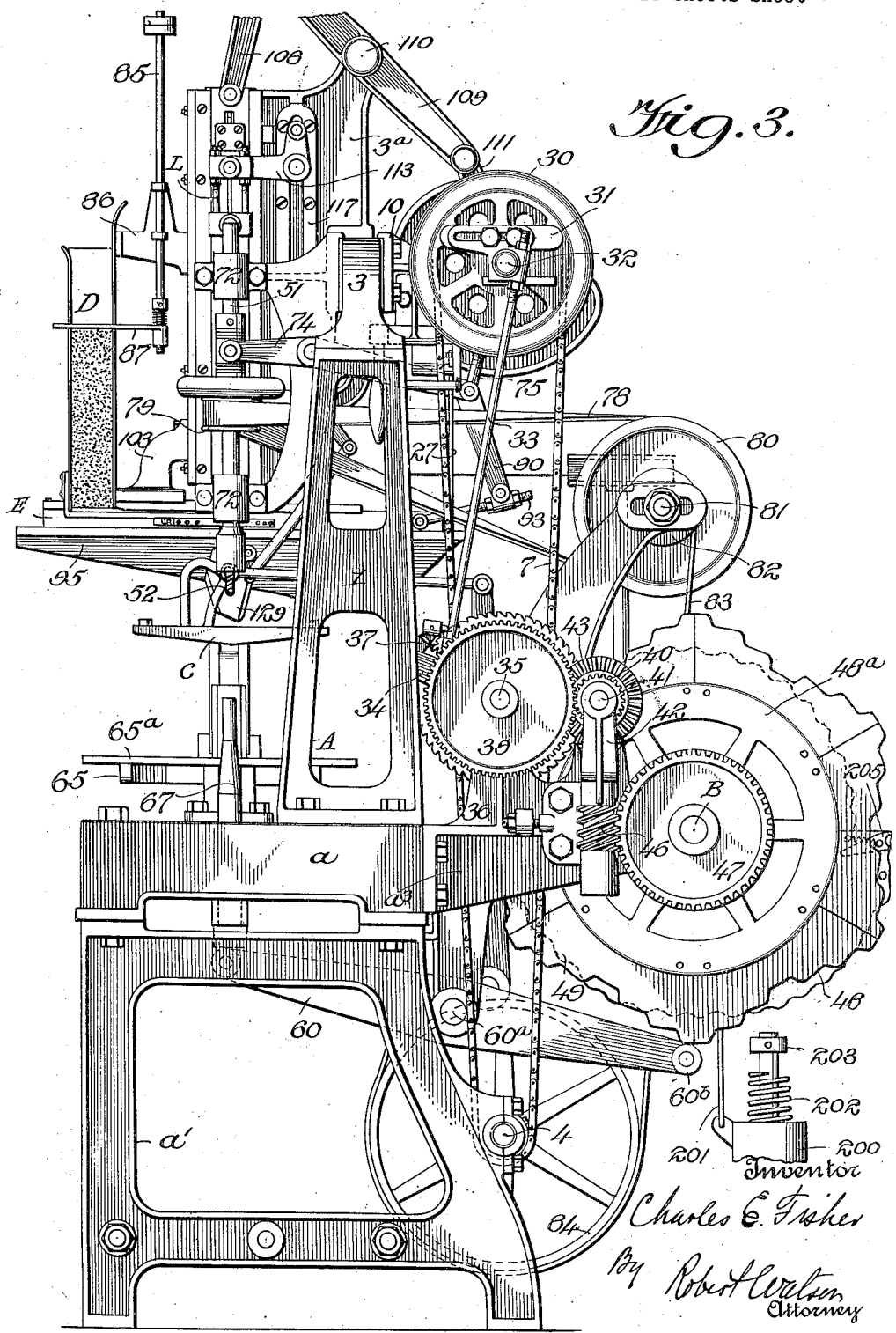

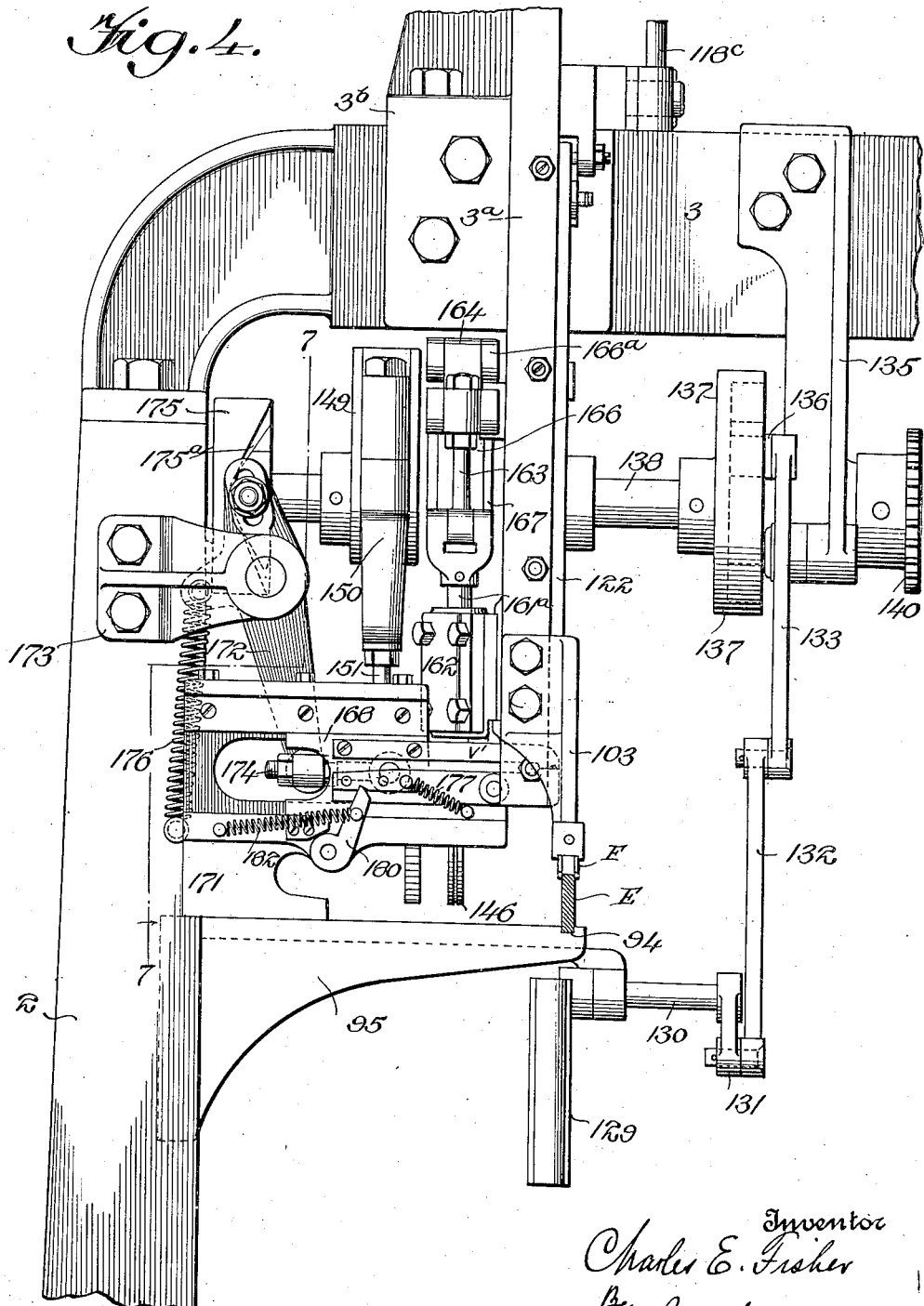

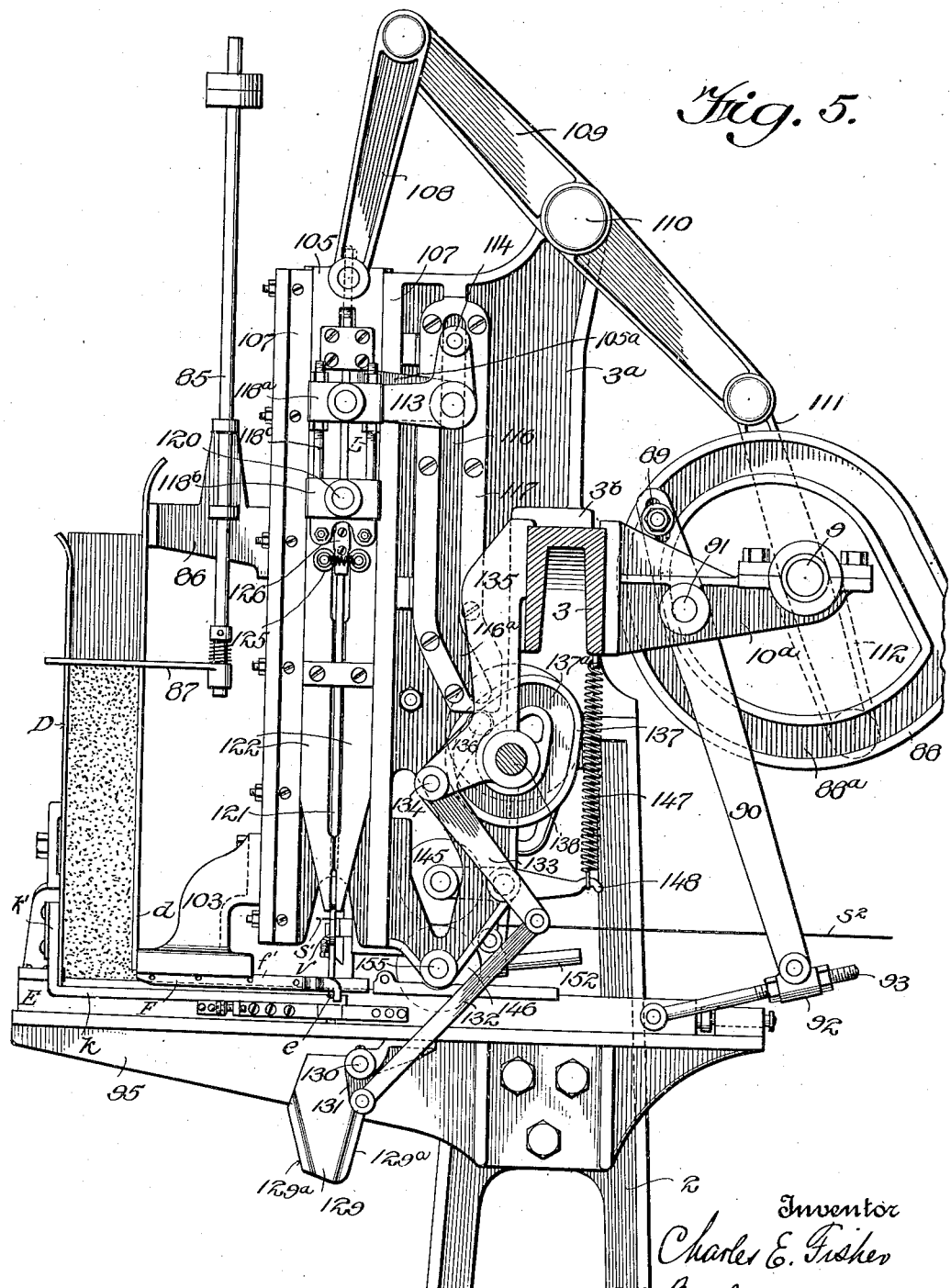

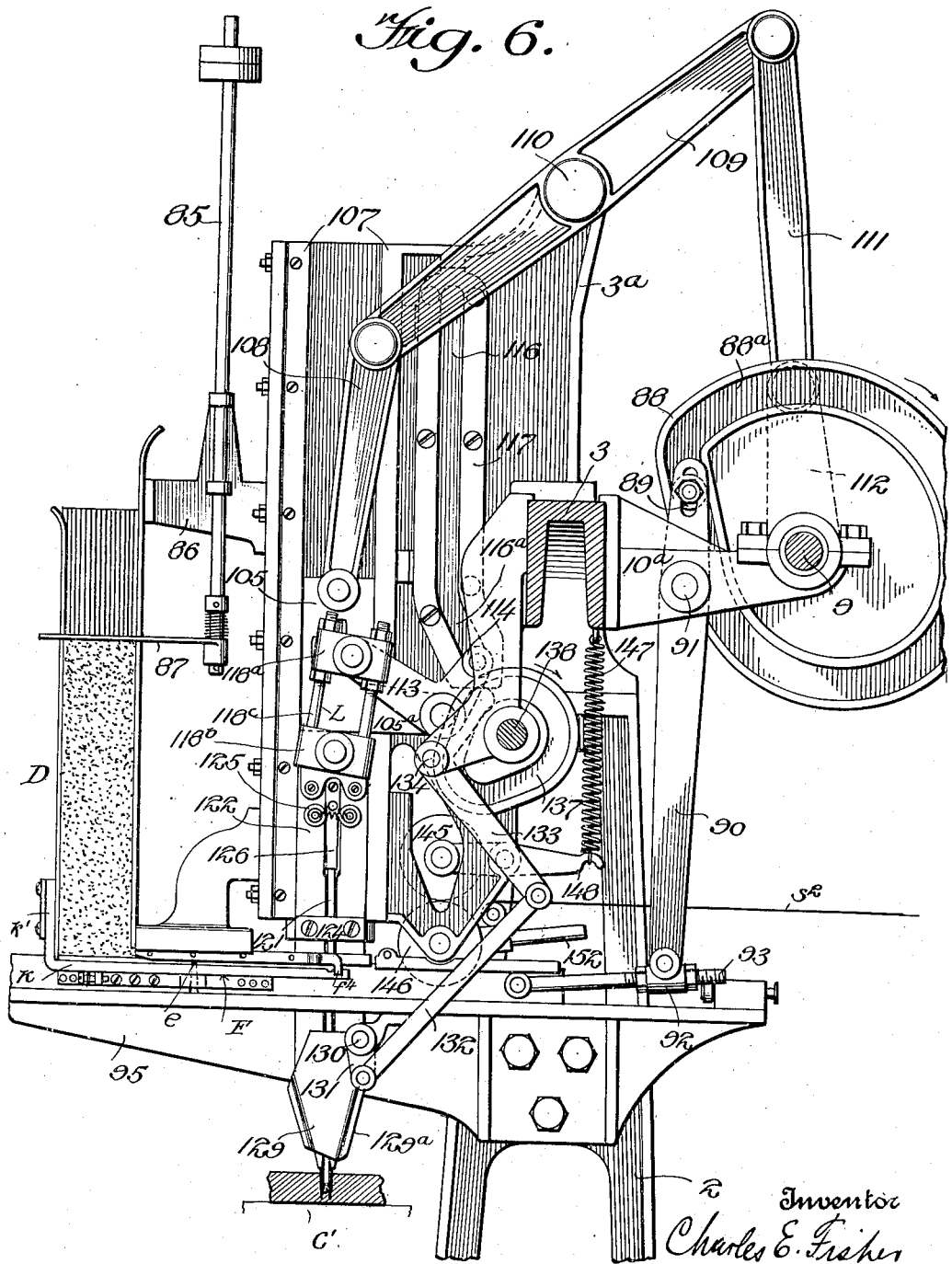

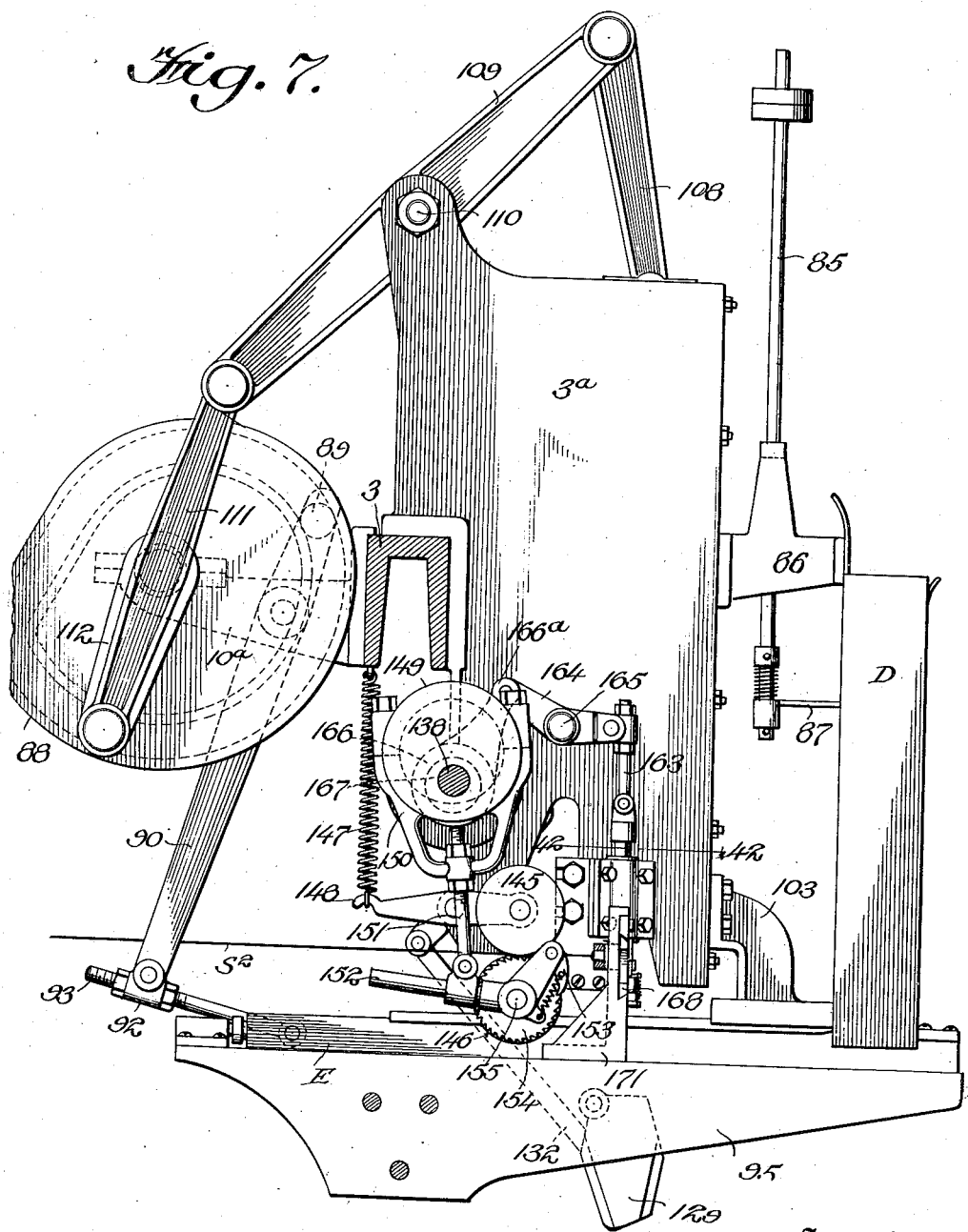

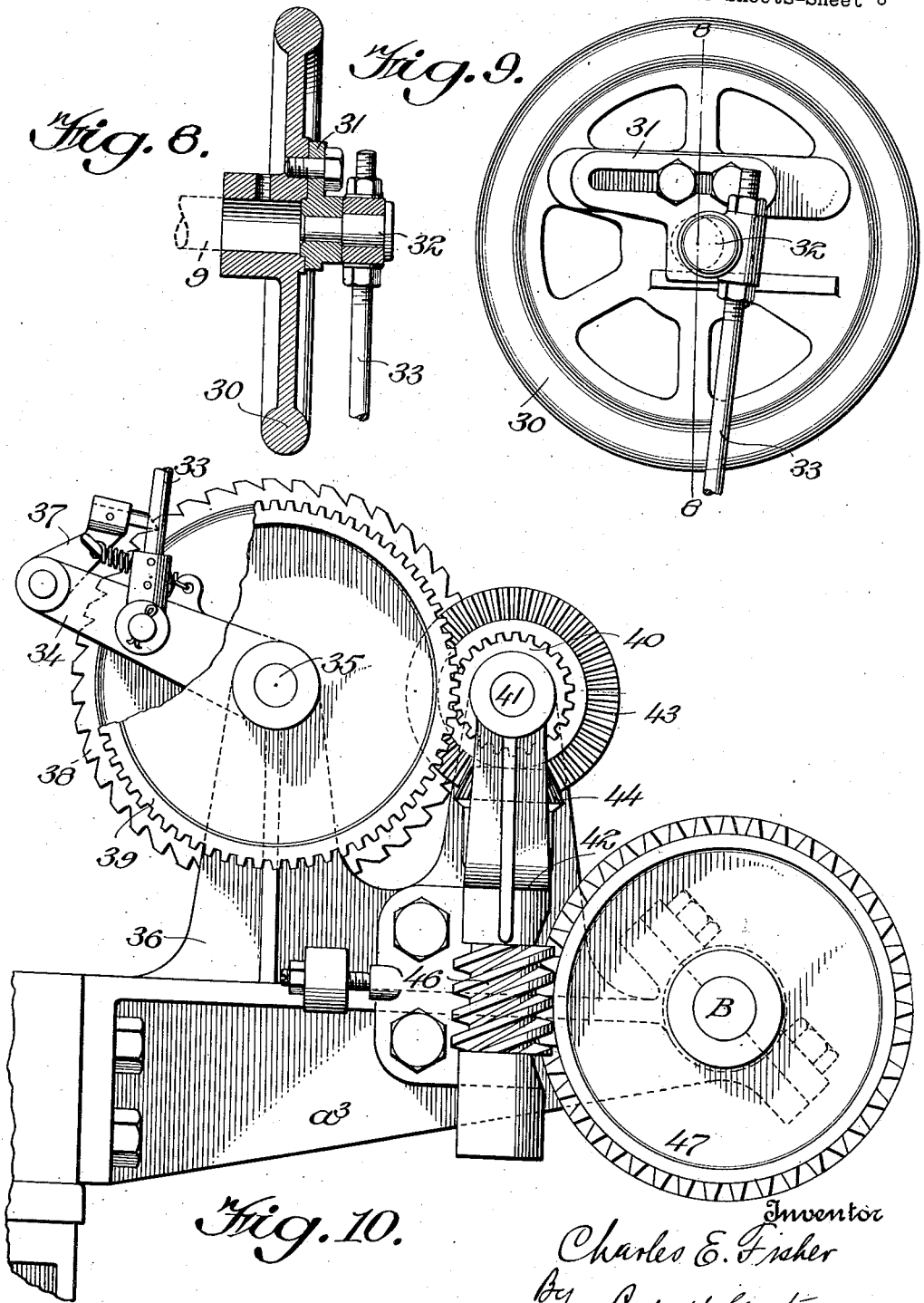

Oct. 21, 1924.

C. E. FISHER 1,512,588

BRUSH MAKING MACHINE

Filed June 21, 1921    16 Sheets-Sheet 9

Inventor
Charles E. Fisher
By Robert Watson
Attorney

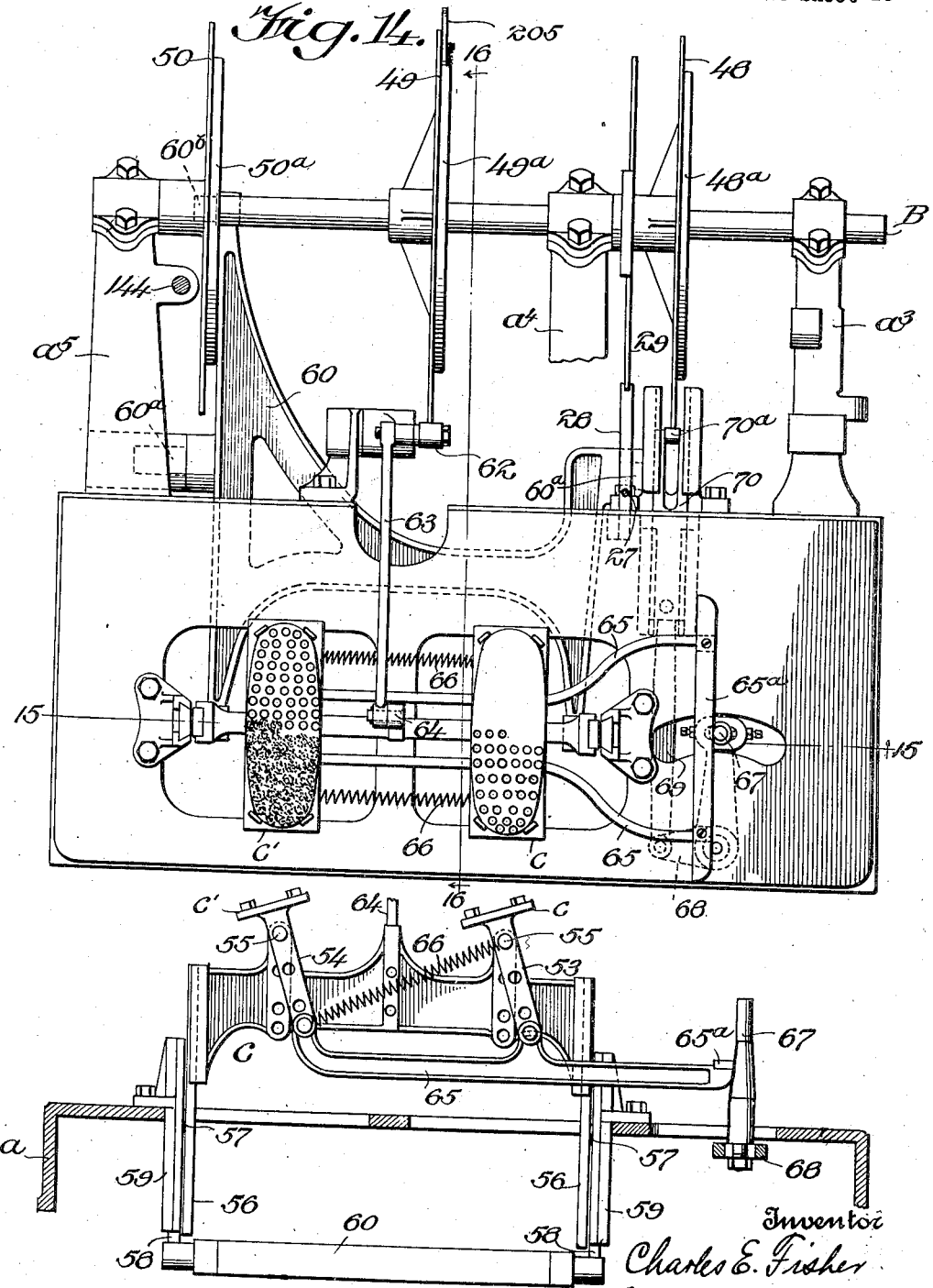

Oct. 21, 1924.                                            1,512,588
C. E. FISHER
BRUSH MAKING MACHINE
Filed June 21, 1921         16 Sheets-Sheet 11

Inventor
Charles E. Fisher
By Robert Wilson
Attorney

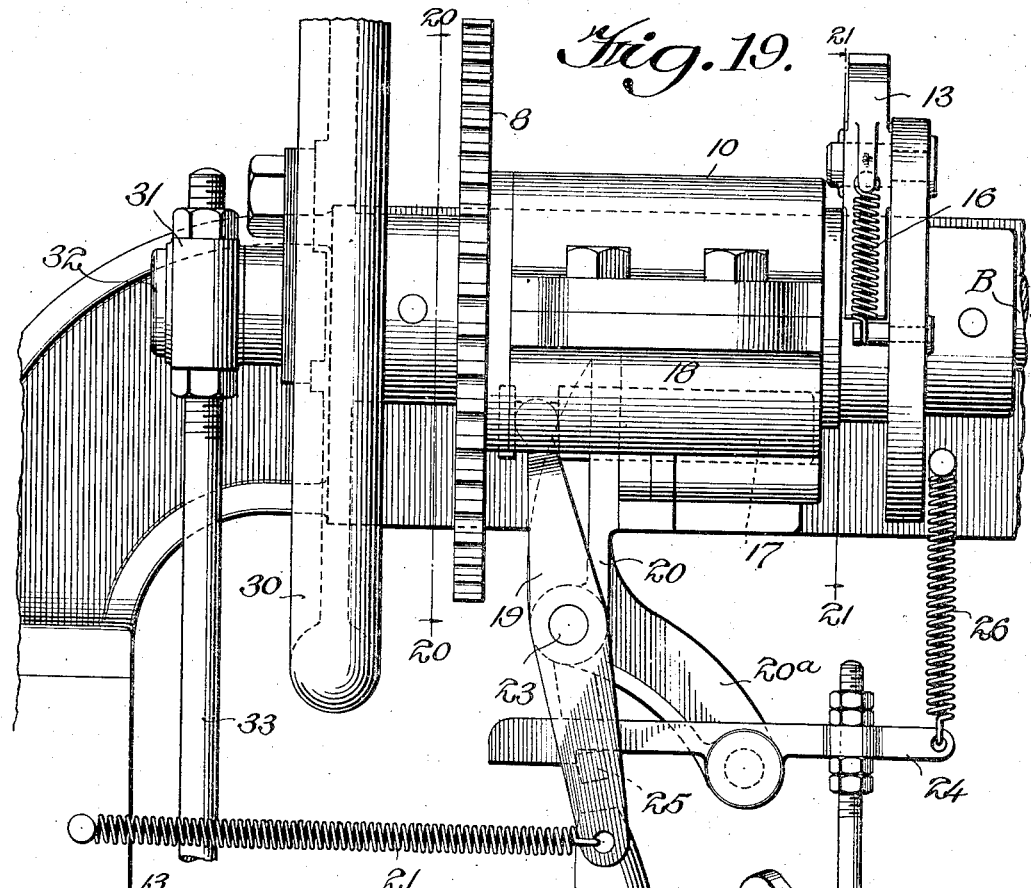
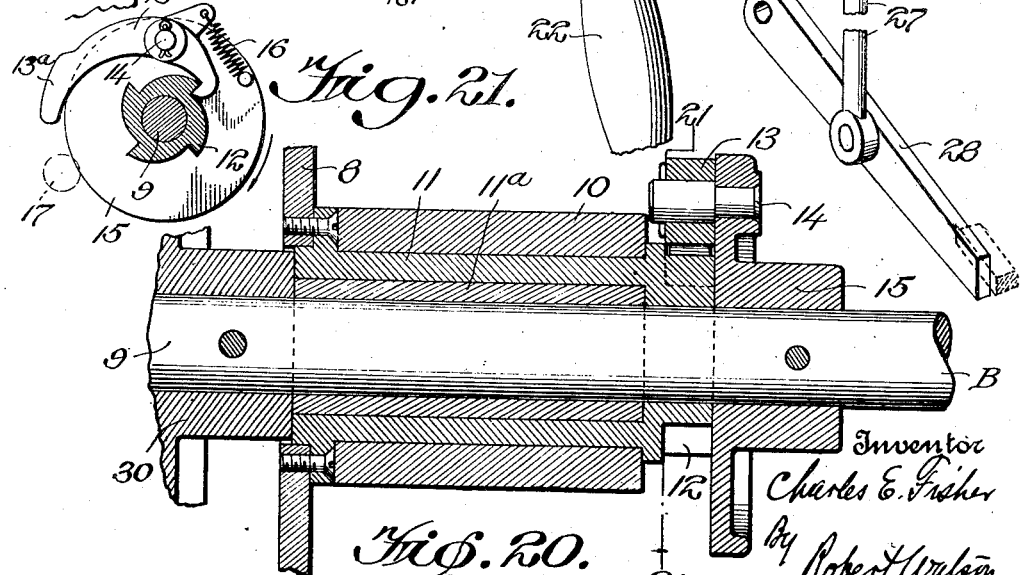

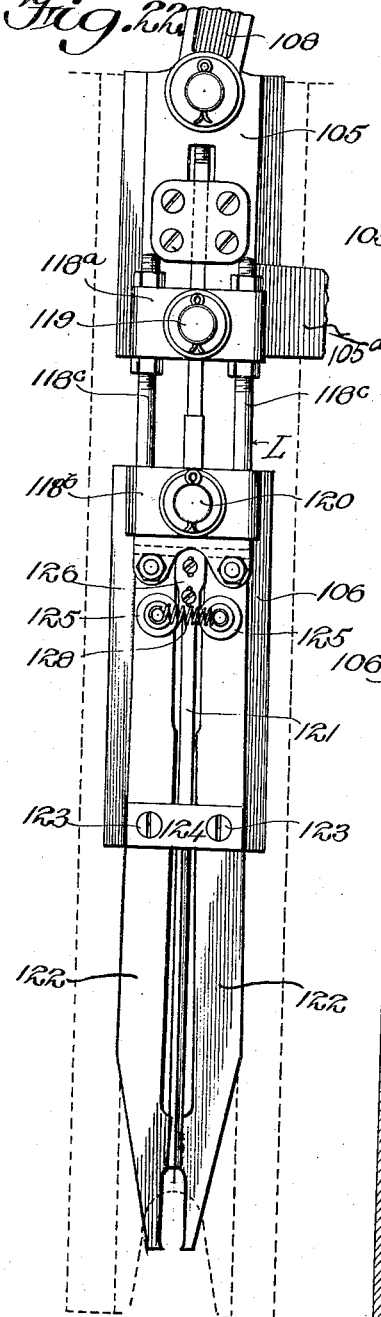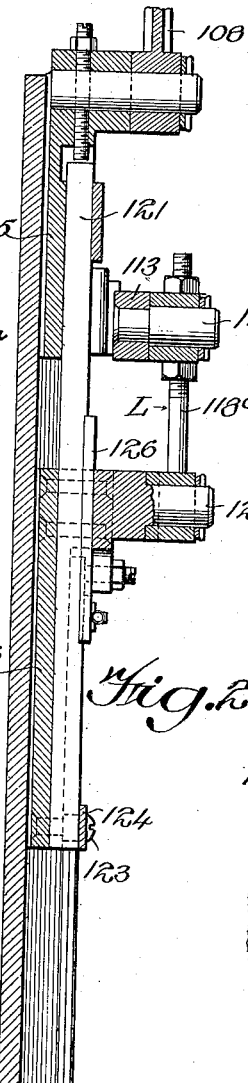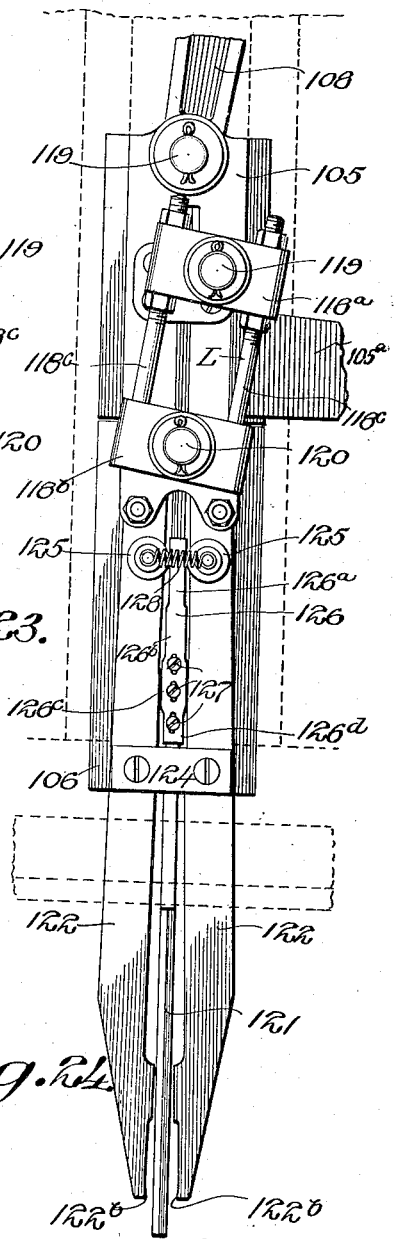

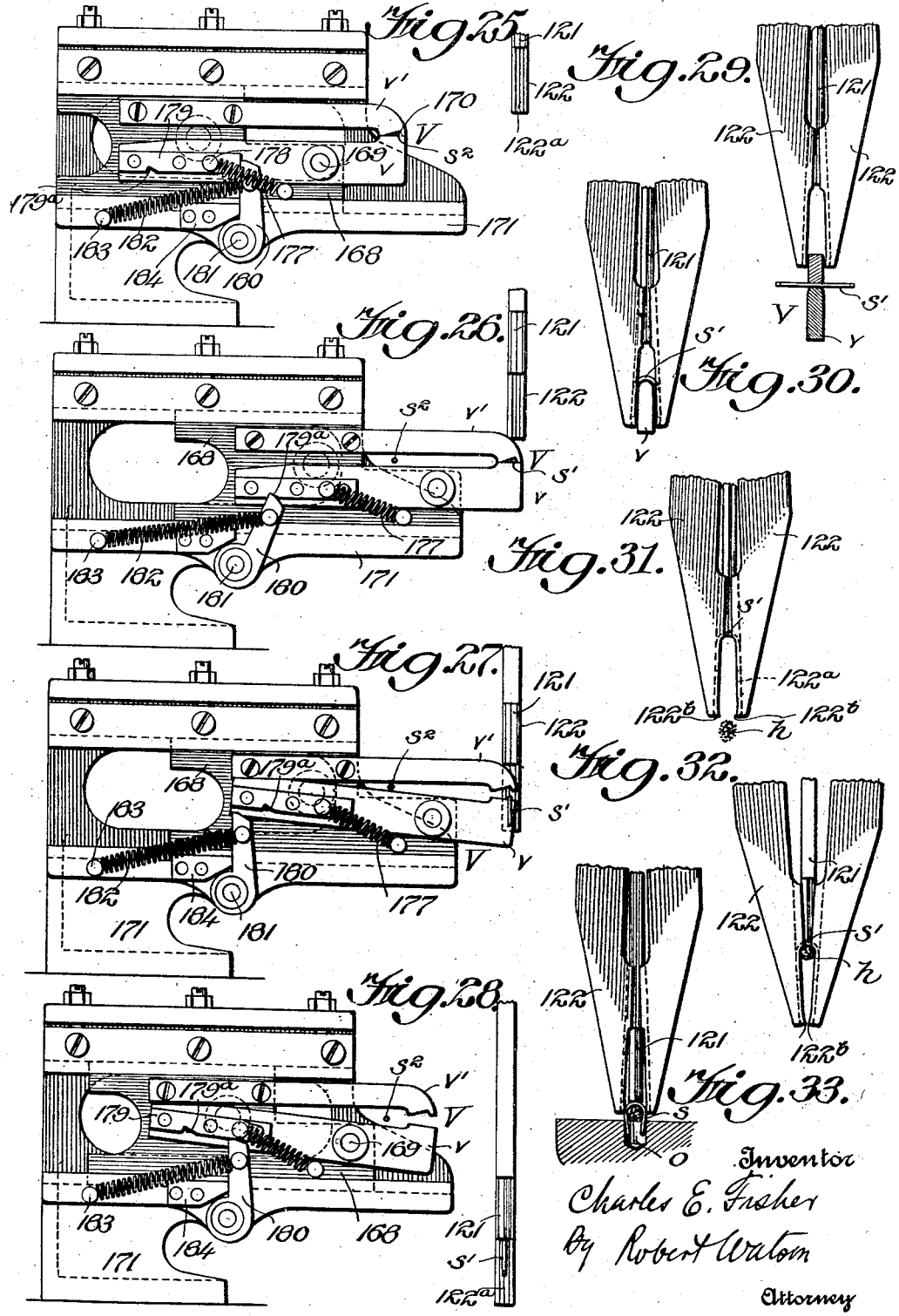

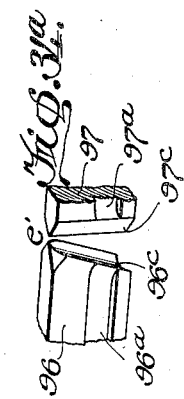
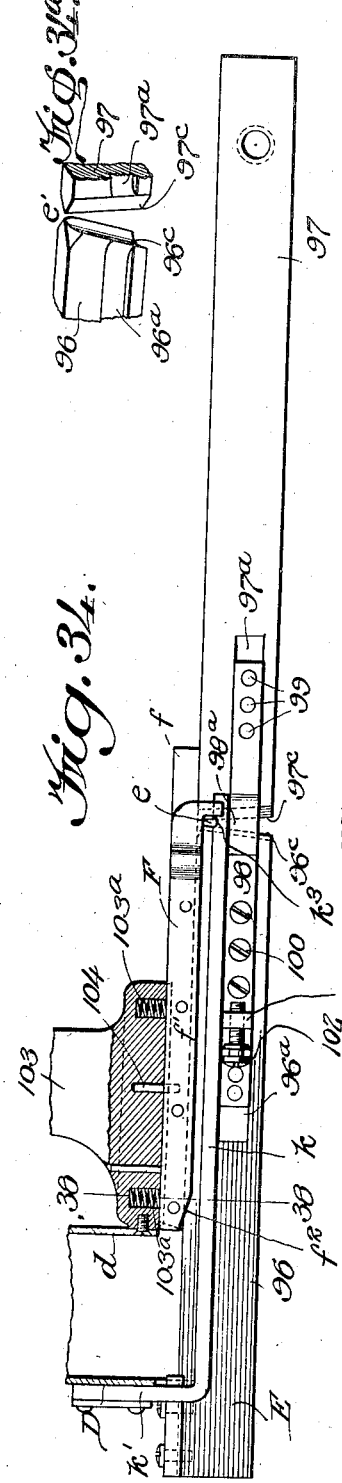
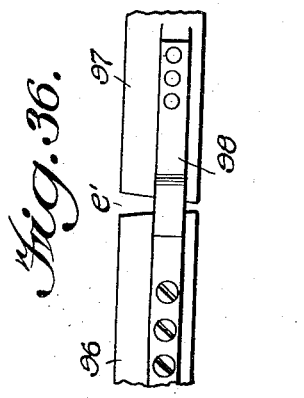
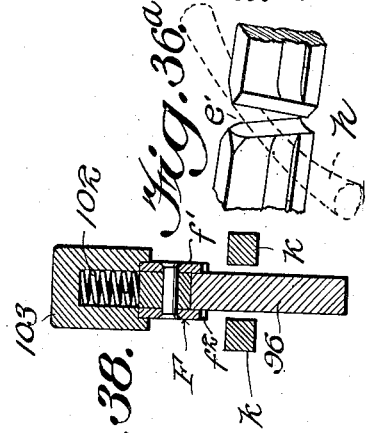
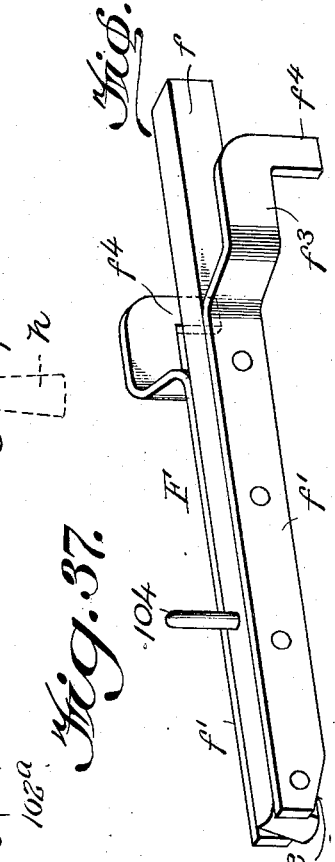

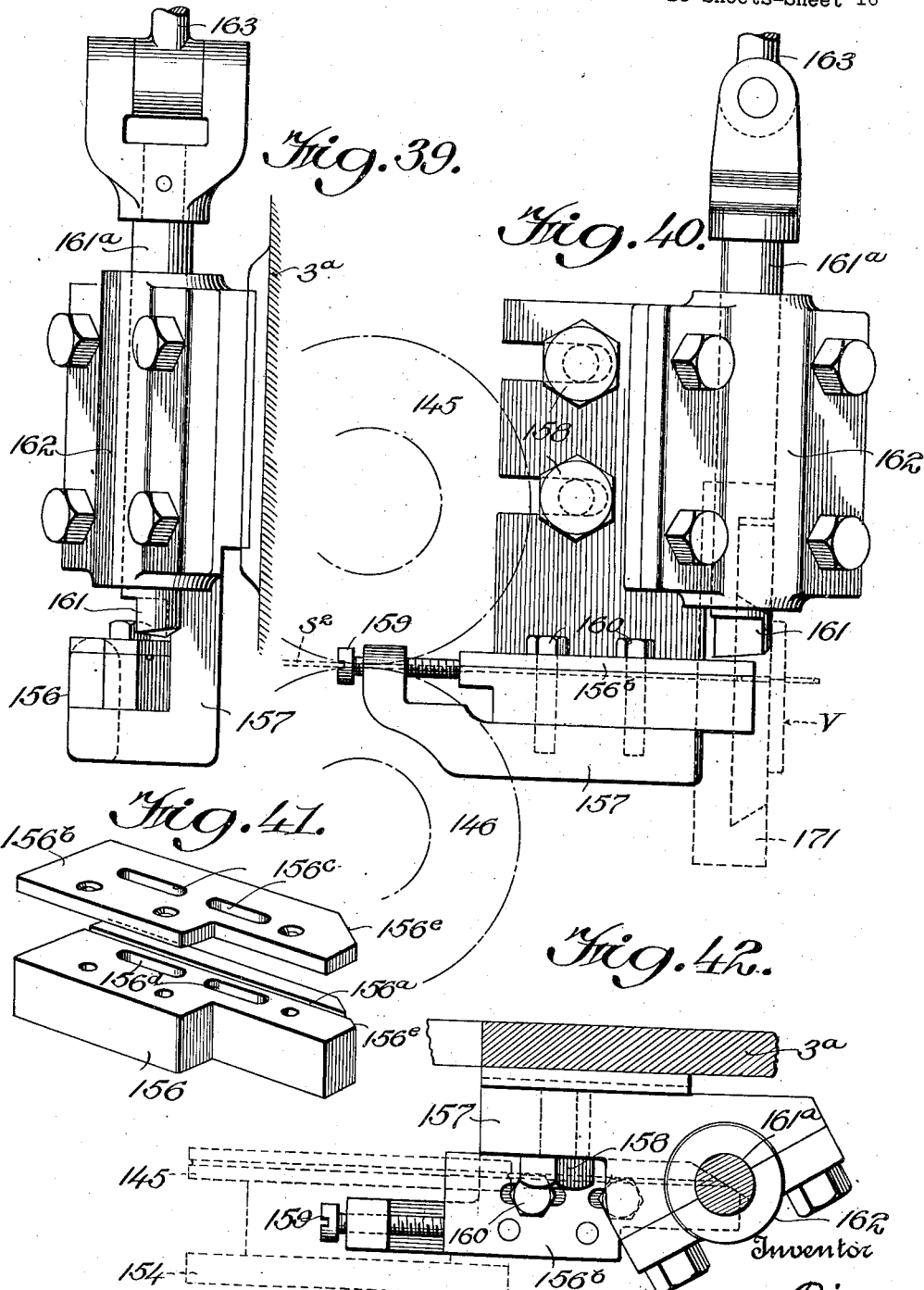

Patented Oct. 21, 1924.

1,512,588

UNITED STATES PATENT OFFICE.

CHARLES E. FISHER, OF BALTIMORE, MARYLAND, ASSIGNOR, BY MESNE ASSIGNMENTS, TO THE FISHER AUTOMATIC BRUSH MACHINE COMPANY, INC., OF BALTIMORE, MARYLAND, A CORPORATION OF MARYLAND.

BRUSH-MAKING MACHINE.

Application filed June 21, 1921. Serial No. 479,253.

*To all whom it may concern:*

Be it known that I, CHARLES E. FISHER, a citizen of the United States, residing at Baltimore, in the State of Maryland, have invented certain new and useful Improvements in Brush-Making Machines, of which the following is a specification.

This invention relates to improvements in machines for making brushes, such as scrubbing brushes. The general type of machine to which the improvements are applicable is well known, and comprises a pair of tables adapted to hold wooden blocks shaped to form brush backs, a boring tool arranged over one table and stapling mechanism for applying tufts to the blocks arranged over the other table, means for operating the boring tool and stapling mechanism simultaneously and intermittently to bore holes in one block and apply tufts to previously bored holes in the other block, and means for automatically shifting the tables to position the blocks so that the holes will be bored in one block in accordance with a predetermined pattern while tufts are secured in the holes in the other block, previously bored according to the same pattern.

The present improvements relate more particularly to the form of the tufting slide or bar by which wisps of fibre or bristle are gathered from a magazine and carried into position to be formed into tufts and secured to the brush blocks by staple forming and applying mechanism; to improvements in stapling mechanism whereby the staple prongs, after straddling the wisps of fibre or bristle, are given an inward set which insures the entrance of the staples into the openings in the brush block without the necessity of causing the staple guides to follow, with the staple, into actual contact with the blocks; to improvements in the mechanism for cutting off and feeding the wire which forms the staples to the staple-forming and driving devices; to means for giving a step-by-step movement to the cams which control the movements of the brush block tables, and to various details of construction and arrangement.

In the accompanying drawings, which illustrate the invention,

Fig. 3 is a right side elevation of the same;

Fig. 4 is a front elevation of the upper left hand part of the machine, embodying the tufting and staple-forming and driving devices, the parts shown being those at the left of the line 5—5 in Fig. 1;

Fig. 5 is a section on the line 5—5 of Fig. 1, the staple-forming and driving mechanisms being in their upper positions;

Fig. 6 is a similar view, the staple-forming and driving mechanisms being in their lower positions;

Fig. 7 is a section approximately on the line 7—7 of Fig. 4;

Fig. 8 is a section on the line 8—8 of Fig. 9;

Fig. 9 is a side elevation of the hand wheel on the clutch shaft and the adjustable eccentric for actuating the feed mechanism associated with the cam shaft;

Fig. 10 is a side elevation of the feed mechanism for the cam shaft;

Fig. 14 is a top plan view of the brush tables and operating means therefor, the upper portion of the machine being removed;

Fig. 15 is a front elevation of the tables for holding the brush blocks and the mechanisms for moving the same, the machine frame being shown in section on the line 15—15 of Fig. 14;

Fig. 16 is a section on the line 16—16 of Fig. 14;

Figure 1:
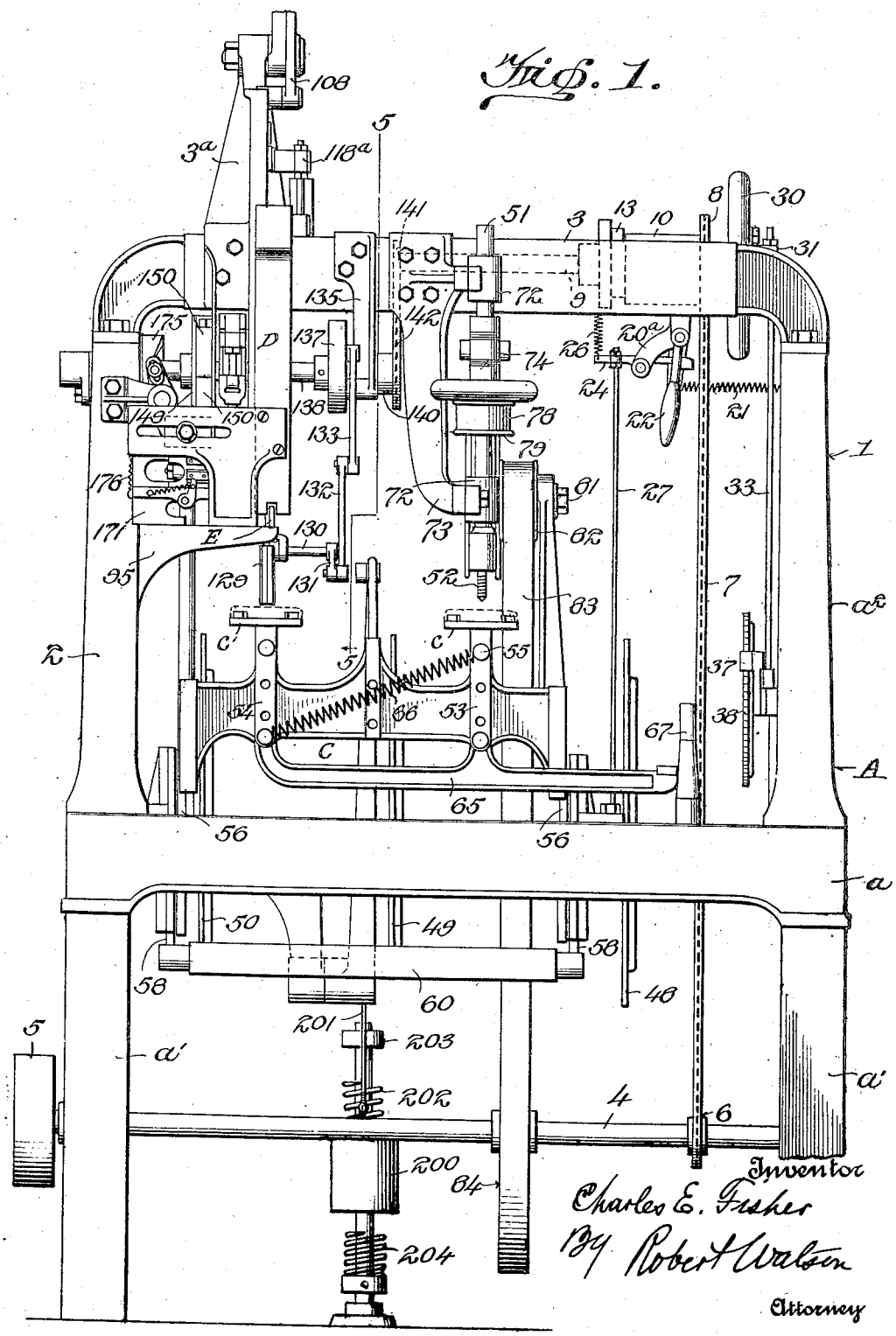
Fig. 1 is a front elevation of the brush-making machine.

Fig. 16ª is a detail view illustrating the manner in which the detent on one of the cam wheels serves to hold the tables in their forward positions after the cam wheels have completed a revolution and have come to rest;

Fig. 17 is a detail perspective view of the rocking and sliding supports for the tilting brush frame, and a portion of said frame, unassembled;

Fig. 18 is a detail view, partly in side elevation and partly in section, showing the same parts assembled;

Fig. 19 is a rear elevation of the clutch mechanism;

Fig. 20 is a central, vertical section through the same;

Fig. 21 is a section, on a smaller scale, on the line 21—21, of Figs. 19 and 20, showing the dog in side view;

Fig. 22 is a front elevation of the staple guides and driver, showing the relations of these parts when in their uppermost position;

Fig. 23 is a longitudinal section through the same, taken centrally between the staple guides;

Fig. 24 is a front elevation of the staple guides and driver, showing the relations of these parts in their lowest positions;

Figs. 25, 26, 27 and 28 are side elevations of the wire carrier in successive positions in a cycle of its movements, the relative positions of the staple guides and driver being indicated by parts thereof;

Figs. 29, 30, 31, 32 and 33 are side views of the lower ends of the staple guides and driver in successive positions, illustrating the operations of forming a staple and applying the staple and tuft to a brush block;

Fig. 34 is a side view of the tufter bar and wisp guides, adjacent parts being shown in section;

Fig. 34$^a$ is a detailed perspective view of the notch jaws shown in Fig. 34;

Fig. 35 is a top plan view of the bar and guides partly broken away;

Fig. 36 is a side view of a portion of a tufter bar having a different form of notch;

Fig. 36$^a$ is a detailed perspective view of the notch jaws shown in Fig. 36.

Fig. 37 is a top perspective view of the upper tufter bar guides;

Fig. 38 is a section on the line 38—38 of Fig. 34;

Fig. 39 is a front view of the wire guide and the cutter for severing the staple wire;

Fig. 40 is a side view of the same, looking from left to right in Fig. 39;

Fig. 41 is a detail perspective view of the parts of the wire guide, separated; and, Fig. 42 is a top plan view of the cutter and wire guide, parts being shown in section on the line 42—42 of Fig. 7.

Referring to Figs. 1 to 7, inclusive, of the drawing, A indicates the frame of the machine comprising a bed or table $a$ supported by legs $a'$, and an arched frame $a^2$, comprising parallel uprights 1 and 2 secured to the bed at its ends, and a cross-piece 3 mounted upon the uprights. The frame also comprises an upright wall or plate 3$^a$, of rectangular shape supported upon the cross-piece 3 by a bracket 3$^b$. This plate which carries the guides for the stapling mechanism is arranged in a plane at right angles to the arched cross-piece 3. A main shaft 4 is mounted in bearings at the back of the legs $a'$, and this shaft is maintained in constant operation by power applied to a pulley 5 on the shaft. The main shaft is provided with a sprocket wheel 6, which is connected by a drive chain 7 to a sprocket wheel 8, (Figs. 19-20) revolubly mounted upon a clutch shaft 9, which is supported in bearings 10 on brackets 10$^a$ and 10$^b$, projecting rearwardly from the cross-piece 3 of the frame. The sprocket wheel 8 is secured to one end of a sleeve 11 (Fig. 20), having an internal bushing 11$^a$ which serves as a bearing for the sleeve and sprocket upon the clutch shaft 9, and the opposite end of the sleeve is provided with an integral toothed wheel 12, (Fig. 21) which forms one member of a clutch for connecting the sprocket wheel with the clutch shaft 9. The other member of the clutch consists of a pawl 13, connected by a pivot pin 14 to a disk 15, which is secured to the shaft 9. The pawl is normally held in engagement with the toothed wheel by a spring 16, and one arm 13$^a$ of the pawl projects beyond the periphery of the disk, as shown in Fig. 21, so that it may be engaged by a spring actuated tripping pin 17, when the latter is projected into the path of movement of the pawl. This tripping pin is slidably mounted in a housing 18, mounted on the bracket 10$^a$, and it is movable into and out of the plane of rotation of the pawl 13 by a lever 19, centrally pivoted to a bracket 20 which depends from the bracket 10$^a$. A spring 21, attached to the lower end of the lever and to a fixed part of the frame, normally tends to project the tripping pin into the path of movement of the pawl, and a handle 22, secured to the shaft 23 on which the lever is mounted, is provided in order that the tripping pin may be manually moved to its retracted position against the action of the spring 21. A latch 24, centrally pivoted to an arm 20$^a$ of the bracket 20, is adapted to engage a lug 25 on the lever and hold the tripping pin in its retracted position. One arm of this latch is connected to a fixed part of the frame by a spring 26, which normally presses the latch toward the lug on the lever.

The direction of rotation of the sprocket wheel 8 and the toothed wheel 12 is indicated by the arrow in Fig. 21, and it will be evident that with the arrangement described, if the tripping pin is in its retracted position, as shown in Fig. 19, the pawl will lock with the wheel 12 and the clutch shaft 9 will rotate with the sprocket wheel; also, that if the latch lever 24 is rocked to release the lever 19, the spring 21 will project the tripping pin into the path of the pawl and the arm 13$^a$ of the pawl will ride under the tripping pin and the pawl will thereby be rocked out of engagement with the constantly driven toothed wheel 12, and the clutch shaft will immediately come to a stop, by reason of the friction of the working parts of the machine. The pawl will be held out of engagement with the toothed wheel by the tripping pin until the latter is manually retracted by moving the handle 22 to swing the lever 19 into locking engagement with the latch 24. When this is done, the shaft 9 will again be set in motion.

The latch 24 is automatically tripped, to release the tripping pin of the clutch mechanism and stop the machine, when the final tuft has been applied to a brush block, by means of a rod 27, connected to the latch lever and to a tappet lever 28, (Figs. 1, 2, 14, and 19) the latter being arranged in the plane of movement of a tappet arm 29 on the cam shaft of the machine, as hereinafter explained.

Figure 2:
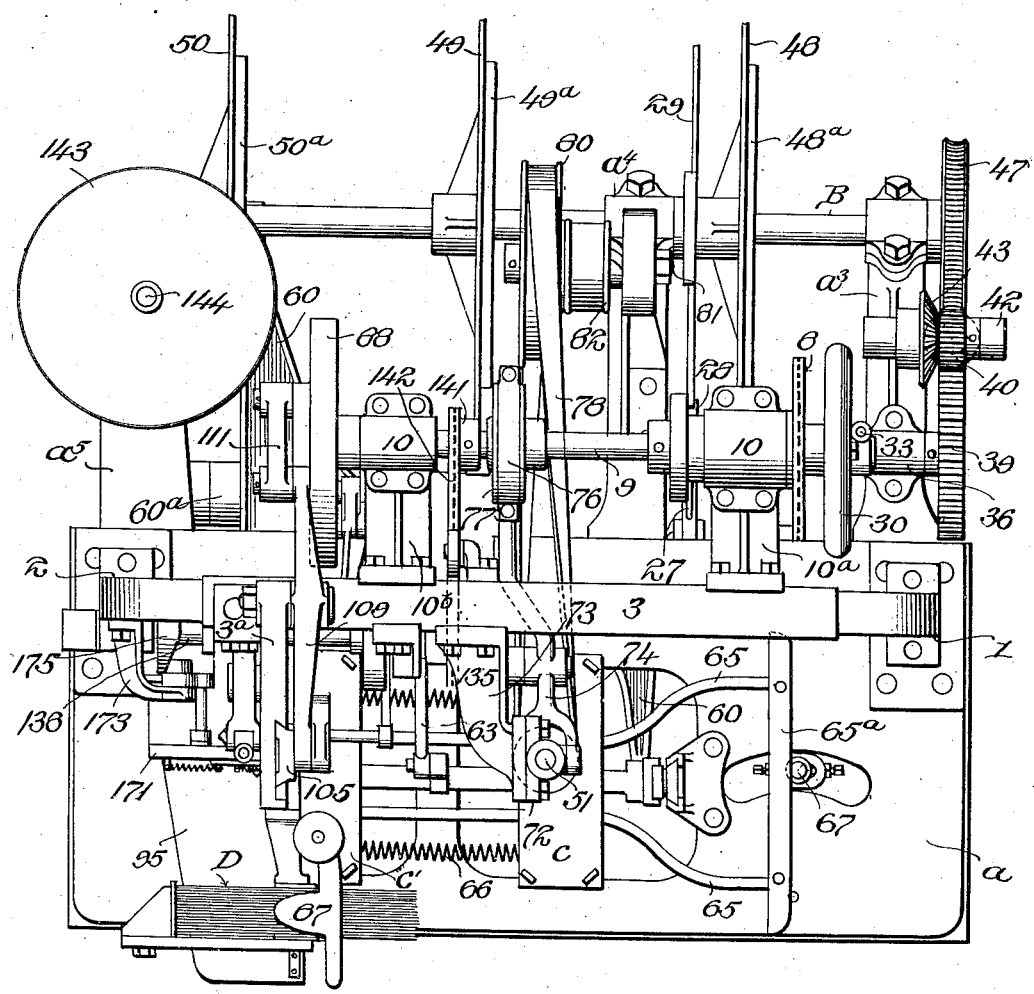
Fig. 2 is a top plan view of the machine.
Figure 11:
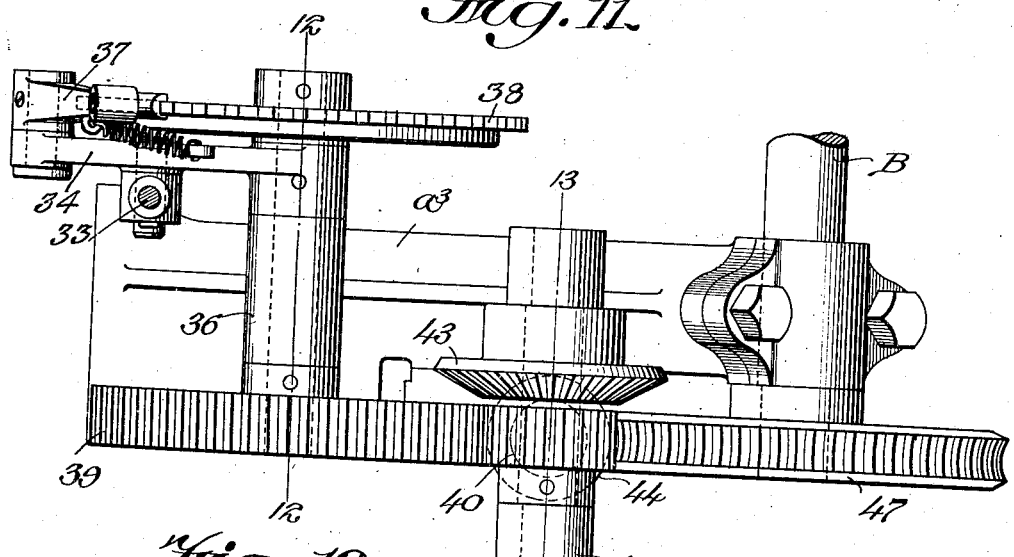
Fig. 11 is a top plan view of the same.
Figure 12:
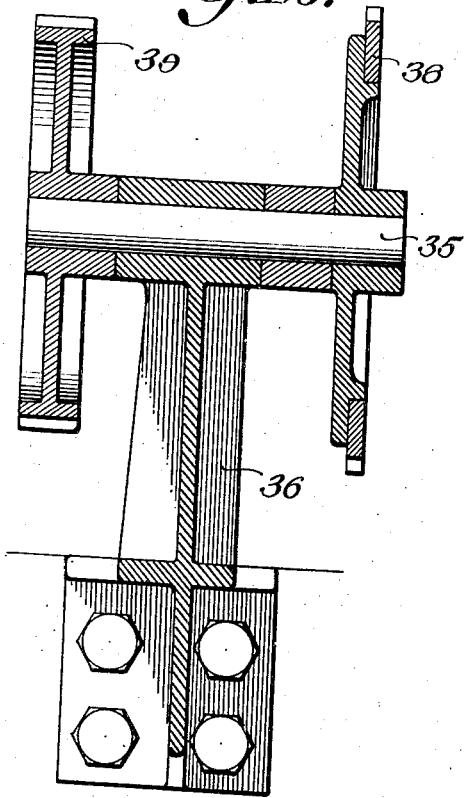
Fig. 12 is a section on the line 12—12 of Fig. 11.
Figure 13:
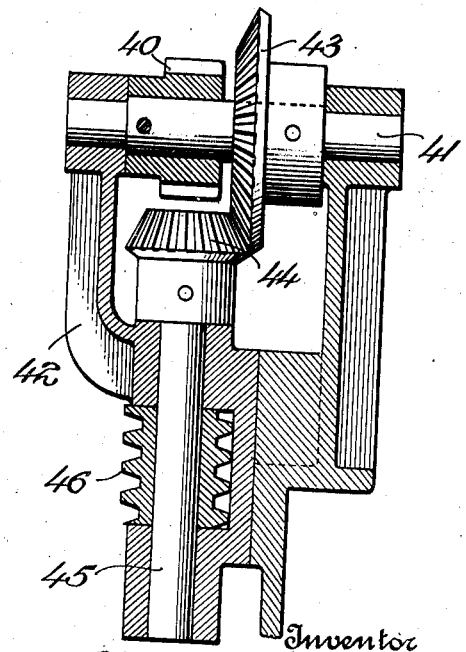
Fig. 13 is a section on the line 13—13 of Fig. 11.

Secured to the clutch shaft 9 is a hand wheel 30, by means of which the cam shaft and the entire mechanism can be turned by hand for the purpose of adjustment or repairs, when desired, and upon the hand wheel is secured an adjustable bracket 31, carrying a crank pin 32, which may be adjusted by the bracket toward and from the axis of the clutch shaft so as to vary the eccentricity of the crank pin (Figs. 3, 8, and 9). Secured to the bracket 31 is a rod 33, which is given a reciprocating motion by the crank pin and operates a mechanism for giving a step-by-step movement to a cam shaft B, which is journaled in brackets $a^3$, $a^4$, and $a^5$, which project rearwardly from the bed plate $a$ of the machine, as shown in Figs. 2, 3, 14. The step-by-step mechanism operated by the rod 33 is mounted upon the bracket $a^3$, and is clearly shown in Fig. 3 and in Figs. 10–13, inclusive, and comprises a ratchet arm 34, pivotally connected to the lower end of the rod 33 and journaled upon a shaft 35 in a support 36, which is integral with the bracket. The ratchet lever carries a spring pawl 37, which engages a ratchet wheel 38, secured to the shaft 35, and upon said shaft is secured a spur gear 39 which meshes with a pinion 40, secured to a shaft 41, which is journaled in a support 42, secured to the bracket $a^3$. Also secured to the shaft 41 is a bevel gear 43 which engages a pinion 44, on a vertical shaft 45, which carries a worm 46, engaging a worm wheel 47 on the cam shaft B. It will be evident that at each back and forth movement of the ratchet rod 33, the ratchet wheel will be moved a fixed distance, and through the gearing described the cam shaft B will be given a proportionate movement. Owing to the self-locking nature of the worm gearing and the friction of the parts moved by the cam shaft, the latter will be prevented from over-running and will stop instantly when the ratchet lever reaches the limit of its forward movement.

The cam shaft B (Figs. 1, 2, 14 and 16) carries three spiders or disks $48^a$, $49^a$ and $50^a$ to which are secured sectional cam rings 48, 49 and 50, respectively, which co-operate, through mechanism to be described, to adjust two brush supporting tables $c$ and $c'$ so that the brush backs, which are carried thereby, may be properly positioned to be operated upon by the boring and stapling mechanisms. As shown in Figs. 1–3, the table $c$ is directly beneath a drill spindle 51, carrying a drill 52, which spindle and drill are operated, as hereinafter described, and the table $c'$ is similarly located with respect to the stapling mechanism, a guide for which is shown at 129 in Figs. 1, 3, 5 and 6.

The brush holders or tables $c$ and $c'$ (Figs. 14–18) are upon the ends of forked levers 53 and 54, respectively, which levers are pivoted adjacent the tables upon pivot pins 55 to the upper part of a frame C, which is mounted so that it may be moved vertically and also rocked forwardly and backwardly. The levers 53 and 54, supporting the brush tables, are so pivoted to the frame C that the tables and arms may be rocked laterally with respect to the frame, as shown in Fig. 15. The frame C has two depending legs 56, which are centrally pivoted at 57 to dove-tailed bars 58, which are movable in vertically arranged guides 59, secured to the bed plate $a$.

The frame C, carrying the tables $c$, $c'$, is movable vertically by a rocking frame 60, (Figs. 1, 2, 3, and 14) which is centrally pivoted upon trunnions $60^a$ and carries at its rear end a roller $60^b$, which is engaged by the cam wheel 50. The forward end of the rocker supports the vertically sliding bars 58 to which the legs 56 of the frame C are pivoted. It will be evident that any rocking movement imparted to the rocker 60 by the cam 50 will cause the frame C to be raised or lowered. The cam surface is so formed that the parts of the brush blocks immediately beneath the drill and stapling device will always be at the same height.

The cam 49, which has a snail form, causes the tables to be rocked from a backward tilting position to a forward tilting position, step by step, during the boring and stapling of the blocks on the tables, to space the holes and tufts longitudinally of the blocks and to give an inclination to the holes and tufts at the ends of the brushes. This cam acts against a roller 61 upon a vertically arranged lever 62, the upper end of which is connected by a link 63 (Figs. 14–16) to an arm 64 which projects upwardly from the top of the frame C. A hand piece $64^a$ is attached to the arm 64, for moving the table frame by hand to re-set it in its rearward tilting position, as hereinafter described. The roller is held in engagement with the cam by a weight 200 which is connected to the lever by a flexible cable 201 passing over the cam shaft. As the table tilts forwardly from its central position more tension is required on the cable to hold the lever so that its roller will bear on the cam, and when the table is moved to the rear of its central position, less tension on the cable is required to hold the roller against the cam. To apply more tension I provide a compensating spring 202 above the weight which is compressed by the latter against a stop 203 as the table tilts forwardly beyond its central position, and to apply less tension to the cable I provide a compensating spring 204 below the weight which relieves the cable of an increasing amount of the weight as the table is moved rearwardly from its central position.

Mounted on the cam 49 adjacent its high end $49^b$ is a pivoted detent 205 which is normally held in a more or less radial position by a spring 206, as shown in Fig. 16, but as the high end of the cam is passing the roller, the latter engages the detent and rocks it about its pivotal point until the longer arm of the detent rests against a stop pin 207 and the shorter arm projects beyond the high end of the cam and forms a continuation thereof which prevents the roller on the lever from dropping immediately to the low end of the cam. When the roller rests upon the detent, as shown in Fig. $16^a$, the stop mechanism before described operates and the entire machine comes to rest. This occurs at the time when the last hole has been bored in one brush block and the last tuft has been secured to the other brush block, and the brush tables are in their extreme forward positions. To reset the tables in their rearmost positions, for the next operation, the operator pulls the tables forward slightly, by taking hold of the handle $64^a$ and this pulls the roller 61 away from the detent and allows the latter to rock to its radial position. The operator then allows the tables to be pulled backward by the weight, and as the detent is now out of the path of movement of the roller, the roller will pass to the lowest point on the cam and the tables will be tilted backward so that the drill and stapling devices may commence to operate on the forward ends of the brush blocks when the machine is again started.

To effect lateral spacing of the holes and tufts in the brush blocks, the levers 53 and 54, which carry the brush block tables, are pivotally connected at their lower ends to a horizontally movable frame 65, (Figs. 14 and 15) and the lower ends of the levers 54 are connected to the pivotal points of the levers 53 by diagonally arranged springs 66, which normally tend to cant the levers and the tables $c, c'$ to the left, as shown in Fig. 15. The frame 65 has a cross-bar $65^a$ which is held in engagement with an upright tapering pin 67 by the springs 66. This pin is mounted upon a bell crank lever 68, the shorter arm of which is connected by a link 69 to a slide 70, which is movable forwardly and backwardly by the cam wheel 48, which engages a roller $70^a$ on the slide. The roller is held in engagement with the cam wheel by the tension of the springs 66, acting through the medium of the parts just described, and it will be evident that as the roller is pressed forwardly by the cam wheel, the pin 67 will be rocked so as to swing the frame 65 to the left, in Fig. 15, and thereby rock the tables $c, c'$, to the right. When the roller $70^a$ enters a depression in the cam wheel, the frame 65 will be allowed to move to the right, in Fig. 15, and the tables will be moved to the left by the springs 66.

The drill shaft 51 (Figs. 1–3) is vertically arranged in bearings 72 on a bracket 73, over the table $c$ and carries at its lower end the drill $51^a$ for boring the brush blocks. The drill and drill shaft are movable vertically by a rocker 74, pivoted to the bracket 73 and connected at its rear end by a rod 75 to the eccentric strap 76, on an eccentric 77 which is mounted on the clutch shaft 9. This drill shaft and drill make one downward and upward movement at each revolution of the clutch shaft. The shaft is constantly driven by a belt 78 which passes around a pulley 79, secured to the drill shaft, and a pulley 80 which is mounted upon a spindle 81 at the rear of the machine the pulley 80 being driven by a smaller pulley 82 connected to it and a belt 83, passing around the latter pulley, and a pulley 84 on the drive shaft 4.

The drill shaft makes one downward and one upward movement for each revolution of the shaft 9, and when a brush block is upon the table $c$, one hole is drilled in the block for each revolution of said shaft. The position of this hole in the block and the angle at which it is bored in the block is determined by the cam wheels 48 and 50 on the cam shaft B, which adjust the tables between successive downward movements of the drill.

While a brush block on the table $c$ is being bored, tufts are simultaneously being applied to the previously bored block, placed on the table $c'$, the adjustments of which are simultaneous with the adjustments of the table $c$. The fibres for forming the tufts are cut to suitable length and arranged in a magazine D and at each revolution of the clutch shaft 9, a wisp of fibre sufficient to form a tuft is carried by a reciprocating tufter bar E from the magazine to a point over the table $c'$, and at this point a staple, formed by the stapling mechanism to be described, is brought down over the center of the wisp and driven into a hole in the brush block, thereby forming a tuft and securing it to the block. The tufter bar slides in a groove 94 (Fig. 4) in a shelf or bracket 95, secured to the end 2 of the main frame. The fibres in the magazine are pressed downward against the tufter bar by a suitable weighted follower 85, sliding in bearings in a bracket 86, (Fig. 5) and having an arm 87 which bears upon the fibres or bristles. Reciprocating movement is imparted to the tufter bar E by a cam wheel 88 on the clutch shaft 9, this wheel having a cam groove 88ª, which is engaged by a roller 89 upon the shorter arm of a lever 90 which is pivoted at 91 to the bracket 10ª. The longer arm of this lever is pivotally connected to a sleeve 92, which is adjustable upon a link 93 connected to the rear end of the tufter bar E. The tufter bar, which is shown in detail in Figs. 34 to 38, inclusive, has in its central portion a notch $e$, for gathering the wisp of fibres while the notch is moving under the magazine and for carrying the wisp into position to be acted upon by the stapling mechanism, which position is shown in Fig. 5.

This tufter bar is one of the important features of the present invention. Heretofore, in brush-making machines reciprocating tufter bars have been used having notches for gathering and carrying the wisps, but these have been provided with moving parts, for opening the notch in the bar to receive the fibres from the magazine, and for closing the notch, to retain the fibres while moving from the magazine to the stapling mechanism. In the tufter bar of my invention, the peculiar form of the notch facilitates the gathering of the wisps, and stationary parts pack the wisps in the notch while the wisp is being carried to the stapling mechanism. Referring to Figs. 34, 34ª and 35, which show a bar with a notch suitable for collecting inelastic or dead material such as tampico, it will be seen that the bar is composed of two sections 96 and 97, rigidly connected together by a connecting bar 98, which fits within grooves 96ª and 97ª in the sides of the tufter bar sections. One end of the bar 98 is secured by rivets 99 to the section 97, and the other end is clamped to the section 96 by screws 100, which pass through enlarged openings 96ᵇ in the section 96 and into a bar 101 on the opposite side of the tufter bar. The section 96 is thus held rigidly in line with the section 97 by the two side bars 98 and 101. The sections may, however, be adjusted relatively to one another to vary the width of the notch $e$, by means of an adjusting screw 102, mounted in a bracket 102ª on the side of the section 96 and engaging a threaded lug 98ᵇ upon the side bar 98. By loosening the screws 100 and turning the screw 102, the width of the notch may be adjusted.

In Figures 34, 34ª and 35, adjacent ends of the sections 96 and 97, which form the jaws 96ᶜ and 97ᶜ of the notch $e$, diverge downwardly and the face of the jaw 96ᶜ is concave while the face of the jaw 97ᶜ is convex, as best shown in Fig. 34ª, while the upper surfaces of the jaws are both substantially V-shaped, as shown in Fig. 35.

When elastic material, such as bristles, is used to form tufts, a tufter bar having a notch like that shown at $e'$ in Figs. 36 and 36ª is used. It will be noted that while the opposing faces of the jaws in these figures are concave and convex, as in the previously described figures, the downward slopes of the jaws are the reverse, so that the notch is widest at the top.

In both forms of jaw, when the tufter bar is moved forward, or to the left, in Figures 5 and 34, as the notch moves beneath the magazine the fibres or bristles are caught near their centers by the upper edge of the convex jaw and are bent as indicated in dotted lines in Fig. 36ª and drop into the notch. Upon the backward movement of the tufter bar these bristles straighten out and tend to bind between the jaws.

Upon the top of the tufter bar is arranged a guide F composed of a bar $f$ which rests upon the tufter bar, and two side strips $f', f'$ which extend slightly below the top of the tufter bar, forming an inverted channel in which the tufter bar moves.

The guide is yieldingly pressed upon the tufter bar by springs 103ª (Figs. 34 and 38), these springs being arranged in the base of a bracket or foot 103 which is attached to the part 3ª of the frame. The guide is held against longitudinal movement on the tufter bar by a pin 104 which projects from the guide into a socket in the foot 103. The bar $f$ extends from the wall $d$ of the magazine rearwardly to a point beyond the line of the stapling mechanism, and the forward end of the bar $f$ forms a strick for preventing loose fibres from being carried out of the magazine when the wisps are carried out in the notch of the tufter bar.

The side bars $f', f'$ form guides adapted to bear on the wisps and depress and hold them in the notch while being carried to the stapling mechanism. The lower edges of these guide pieces are downwardly inclined at their forward ends, as shown at $f^2$, and thence extend rearwardly parallel with the top of the tufter bar, the rear portions of the guide pieces being bent outwardly in opposite directions as shown at $f^3$, and terminating in downwardly extending parts $f^4$ which form stops for the wisps and retainers for the lower guides presently to be described.

The wisps of fibre or bristles, as they are drawn from the magazine are immediately depressed in the notch of the tufter bar, by the inclined ends of the guides $f'$, against a pair of lower guides $k, k$, which extend parallel with the lower edges of the guides $f'$ to the stapling point. These lower guides consist of bars having upwardly turned forward ends $k'$, which are attached adjustably to the forward side of the fiber magazine, and the rear end of one guide is offset from the tufter bar, as shown at $k^2$ (Fig. 35), to provide a space in between it and the tufter bar for the staple guides to pass through. Recesses $k^3$ are formed in the upper edges of the lower guides immediately in advance of the downwardly turned ends $f^4$ of the upper guides, and the latter bear against the outer sides of the lower guides to keep them from spreading when the stapling devices double the wisp into a tuft and force it through the space $w$.

The wisps, as they are drawn from the magazine engage the inclined ends of the guides $f'$ and are compressed against the lower guides and carried between the guides to the shallow recesses $k^3$ and against the stops $f^4$. Here the wisps expand vertically in the shallow recesses and assume a shape more suitable for receiving the staples. By compressing the wisps at their centers as they leave the magazine, the fibres are prevented from being drawn in edgewise out of the notch by the adherence of their ends to the ends of fibres remaining in the magazine.

The staple-forming and driving mechanism comprises upper and lower slides 105 and 106, (Figs. 1, 5, 6, 22, 23, and 24) which are movable in vertical guideways 107 on the side of the upright wall or partition $3^a$ of the frame. The upper slide 105 is connected by a link 108 to one end of a lever 109, which is centrally pivoted at 110 to the frame $3^a$. The opposite end of the lever is connected by a link or connecting rod 111, to a crank arm 112, on the shaft 9, whereby at each rotation of said shaft the upper slide 105 makes a movement from the position shown in Fig. 5 to the position shown in Fig. 6 and a return movement. The slide 105 has a laterally projecting arm $105^a$, upon which is pivoted a bell crank 113, one arm of which is provided with a roller 114, engaging a guideway 116, which extends parallel with the guides in which the slide 105 moves for a greater part of its length and inclines at its lower end away from said guides, as shown at $116^a$. This guide groove 116 is formed by an endless strip of metal 117. The other arm of the bell crank 113 is pivotally connected to a link L, composed of two cross heads $118^a$ and $118^b$, adjustably connected together by a pair of rods $118^c$. The bell crank is connected to the upper cross head $118^a$ by a pin 119, and the lower cross head of the link is connected to the upper end of the slide 106 by a pin 120. A staple driving rod 121 is rigidly secured to the upper slide 105 and this rod extends downwardly between a pair of staple guides 122 which are pivotally connected, near their centers, to the lower end of the slide 106 by pivot pins 123, passing through a cross-piece 124 into the slide. The lower adjacent edges of the guides are recessed, as shown at $122^a$ to receive the staples, and the recessed ends are slightly convergent, as shown at $122^b$, Figs. 24 and 31.

The upper portions of the staple guides are provided with rollers 125 which bear upon the opposite edges of a cam strip 126, adjustably secured to the staple driving rod 121 by screws 127. The upper ends of the staple guides are constantly pulled toward one another by a spring 128, mounted on the studs which carry the rollers 125, and this spring constantly presses the rollers against the cam strip. The opposite edges of said strip are formed alike and the strip is of different widths at various points in its length. Thus, the upper part $126^a$ is narrow so that when this part is between the rollers, as shown in Fig. 24, the staple guides 122 will be closer together at the top than at the bottom. Below the part $126^a$ of the cam strip is a section $126^b$, of greater width, and when this part is engaged by the rollers 125, the upper ends of the staple guides will be spread further apart and the lower ends will be brought closer together. Another section $126^c$ of the cam strip spreads the upper ends of the staple guides still further apart and brings the lower ends closer together, and below the part $126^c$ on the cam strip is a part $126^d$, which holds the staple guides with their lower parts slightly divergent when the rollers are against this part. Normally, when the parts are in their uppermost position, as shown in Fig. 22, the rollers rest against the part $126^d$ of the cam strip and while the slides carrying the staple guides and driving rod are descending, with the roller on the bell crank 13 engaging the straight part of the slot 16, the rollers 125 still remain in engagement with the part $126^d$ of the cam strip and the lower halves of the staple guides diverge slightly. As the roller on the bell crank 113 commences to ride out into the groove $116^a$, the staple driving rod, attached to the slide 105, travels faster than the staple guides attached to the slide 106, and hence the cam strip, which is carried by said rod, moves downward relatively to the rollers 125 and this spreads the upper ends of the staple guides and causes the lower ends to converge, as shown in Fig. 32. The part $126^b$ of the cam strip then engages the rollers on the staple guides and this allows the lower ends of the staple guides to spread and lie substantially parallel, and at the final part of the downward movement of the staple guides, the rollers engage the part $126^a$ of the cam strip and this allows the lower ends of the staple guides to diverge, as shown in Fig. 33. The staple driving rod then makes a further movement and extends beyond the lower ends of the staple guides to drive the staple, this movement being shown in Fig. 24. The slides and various connected parts then move back to their uppermost positions shown in Figs. 5 and 22.

Prior to each downward movement of the staple guiding and driving devices, a piece of wire of the proper length to form a staple is fed into position to be engaged and bent into the form of a staple by the staple guides, the mechanism for cutting off and feeding the pieces of wire being hereinafter described. Heretofore, in brush-making machines of this type, staple guides resembling those here shown have been employed to form staples having substantially parallel sides and to carry the staples with the tufts to the brush block. It has been necessary to allow the guides to travel downward into contact with the block in order to correctly position the staple in the hole bored in the block to receive the staple and tuft, and for that reason it has been customary heretofore to mount the staple guides on the lower slide (106) by a yielding connection which would permit the guides to yield with respect to the slide when the former engage the brush block. The continuous striking of the guides against the block is not only injurious to the parts but makes the operation very noisy. In the present invention, I avoid the necessity of causing the staple guides to travel into contact with the block, and therefore the necessity for the resilient connections between the staple guides and the lower slide, by centrally pivoting the guides and providing the cam strip 126 on the staple driver, which causes the lower ends of the guides to form the staple with a converging set to its prongs, as best shown in Fig. 33, whereby the staple (indicated at $s$ in said figure) will surely enter the opening $o$ in the block without having the staple guides follow down into contact with the block.

The operation of the staple guides and staple driver in forming and driving the staple will be clear from Figs. 29–33, inclusive of the drawing. In Fig. 29, a strip of wire $s'$, pointed at the ends, is held between the jaws of a movable vise V (shown in Figs. 25–28 and hereinafter described), in position to be acted upon by the staple gudes. In this upper position of the staple guides, the cam rollers 125 on said guides rest upon the lower part $126^d$ of the cam strips on the staple driver, as shown in Fig. 22, and the lower ends of the staple guides diverge slightly. The staple guides and staple driving rod move downward in fixed relation to one another, while the bell crank 113 engages the vertical part of the slot 116 (Fig. 6), and during this part of the movement the cam rollers 125 remain in engagement with the part $126^d$ of the cam strip on the staple driving rod. During this part of the movement, the lower ends of the staple guides engage the strip $s'$ and bend it over the lower vise jaw $v$, into a staple having somewhat diverging prongs, as shown in Fig. 30. This staple is pressed up into the end of the grooves $122^a$ in the staple guides and the vise then recedes, leaving the staple as shown in Fig. 31, above the wisp $h$ in the tufter bar. As the staple guides move downward, the staple is carried over the center of the wisp in the tufter bar and at this point, the bell crank 113 (Fig. 6) commences to ride out into the inclined portion $116^a$ of the slot 116 and the staple driving rod 121 moves relatively to the staple guides so that the cam rollers 125 are caused to ride on to the part $126^c$ of the cam strip. This causes the upper ends of the staple guides to spread and the lower ends to converge, as shown in Fig. 32, thereby pressing the prongs of the staple inward so that they converge and the distance between their points is considerably less than the diameter of the opening $o$ in the brush block. The staple guides descend with the staple and wisp through the space $w$ in the tufter bar (Fig. 35) to a point adjacent the brush block, as shown in Fig. 33, and during this movement the rollers 125, on the staple guides, ride on the part $126^b$ of the cam strip on the staple driver and this causes the lower ends of the staple guides to spread slightly, and during the final part of the downward movement of the staple guides, the guide rollers ride on to the part $126^a$ of the cam strip and the staple guides rock so that their lower end portions slightly diverge to permit the staple to pass down freely to the inwardly turned ends $122^b$ of the guides, through which it is forced by the staple driving rod 121, which carries the staple and tuft into the hole in the brush block. In passing through the inturned ends of the staple guides the inward set of the staple prongs is increased, insuring their direction into the hole in the block, as indicated in Fig. 33.

In order to accurately position the lower ends of the staple guides with respect to the openings in the brush block while the staples are being driven, a swinging guide 129, secured to a shaft 130, is automatically swung into position to guide the staple guides when the latter are moved downward and swung out of alinement with the staple guides when the latter are moved upward. This swinging guide is in the form of a pocket having downwardly converging sides $129^a$, within which the sloping edges of the staple guides fit closely when the staple guides are in their lowest position, as shown in Fig. 6. The shaft 130 is provided with a crank arm 131, to which is connected a link 132 and this link is connected to one arm of the bell crank lever 133, pivoted at 134 to a bracket 135, which depends from the cross arch 3 of the frame. The other end of the bell crank lever carries a roller 136, which engages a cam groove 137ª in a cam wheel 137, secured to a countershaft 138. This countershaft is journaled in the bracket 135 and in a suitable bearing in the end 2 of the frame, and it is driven at the same speed as the clutch shaft 9 by a sprocket gearing consisting of a sprocket wheel 140, on the shaft 138, and another sprocket wheel 141, of the same diameter, on the shaft 9, these sprocket wheels being connected by a sprocket chain 142. The cam wheel 137 is so designed as to move the swinging guide 129 out of alinement with the staple guides while the latter are moving upward, during which interval the brush block is shifted to bring a new opening in the block beneath the staple guides, and the swinging guide 129 is then returned to receive the staple guides on their next descent. The purpose of moving the guide 129 before shifting the brush block is to avoid interference between said guide and tufts set in the block.

The counter shaft 138 operates the wire feeding and cutting-off mechanism which is best illustrated in Figs. 1, 4, 7, 25 and 28, and 39–42. The wire for forming the staples is carried upon a reel 143, mounted upon a spindle 144, at the rear of the machine (Figs. 1 and 14). The wire $s^2$ leads from the reel to a pair of feed rollers 145 and 146, the former of which is pressed against the latter by a spring 147, attached to a part of the frame and to a centrally pivoted lever 148 upon which the roller 145 is journaled. These feed wheels are given an intermittent feeding movement by ratchet mechanism operating from the counter shaft 138 and comprising an eccentric 149 on which is mounted an eccentric strap 150, connected by an adjustable rod 151 to a ratchet lever 152, having a spring pawl 153, which engages a ratchet wheel 154, on a fixed stud 155 which carries the feed roller 146. The wire is fed through a groove 156ª in a thick guide block 156 (Figs. 39–42), and is held within the groove by a cap plate 156ᵇ which is secured to the block. This guide block is mounted upon a bracket 157, which is adjustably secured by set screws 158 to the upright part 3ª of the frame. The guide block is adjustable horizontally on the bracket by means of an adjusting screw 159, and it may be secured in any position of adjustment by bolts 160 which pass through slots 156ᶜ, 156ᵈ in the cap plate and block, respectively. The forward edges of the cap plate and block are beveled at an angle of about sixty degrees to the axis of the groove 156ª, as shown at 156ᵉ, and the beveled face of the block forms a shearing edge with which a knife or cutter 161 co-operates to cut the wire with a slanting cut which leaves the ends of the piece cut off pointed. This knife, as shown in the drawing, is formed upon the end of a rod or plunger 161ª, which is movable vertically in a bearing 162 on the bracket 157. The upper end of the plunger is connected by a link 163 to one arm of a lever 164, which is pivoted centrally upon a stud 165, projecting from the part 3ª of the frame, and the other arm of this lever is pivoted to an upward extension 166ª of an eccentric strap 166, which strap is fitted around an eccentric 167 on the shaft 138.

The eccentrics which operate the cutter and the wire feed rollers actuate these devices alternately so that after each cutting operation a length of wire sufficient to form a staple is fed forward into position to be severed at the next downward movement of the cutter. This length of wire is fed into position to be gripped centrally of its length by a sliding vise V, and it is then cut off, leaving the wire length $s'$ in the vise, with its ends projecting beyond the sides of the vise, as shown in Figs. 5 and 29, and the vise then moves forward to the position shown in Figs. 4 and 26, to carry the wire length into position to be acted upon by the staple forming and driving mechanism. This vise V comprises an upper jaw $v'$, fixed to a slide 168, and the lower jaw $v$, pivoted at 169 to said slide, the upper jaw being provided with an angular notch 170 for receiving the wire, which notch is closed by the lower jaw while the slide is moving forward to deliver the wire length to the stapling mechanism. The slide 168 is movable horizontally in dove-tailed guides in a bracket 171, which is mounted upon the shelf or table 95. The slide is reciprocated by a lever 172, pivoted in a bracket 173, connected to the upright 2 of the frame, the longer arm of this lever being connected to the slide by a link 174 (Fig. 4) and the shorter arm being provided with a roller which engages the side of a cam wheel 175, said cam wheel having a depression 175ª, into and out of which the roller rides to rock the lever and reciprocate the vise slide. The roller is held in engagement with the cam wheel by a spring 176, which is connected to the lever and to a fixed part of the frame. With this arrangement, it will be obvious that at each rotation of the counter-shaft 138 the vise will be given a back and forth movement.

Referring to Figs. 25–28, which show the vise in detail and illustrate its operation, a spring 177, connected to the slide 168, at the rear of its pivotal point 169, extends rearwardly and is attached to a pin 178 on the lower jaw of the vise. This spring constantly tends to hold the forward end of the lower jaw against the forward end of the upper jaw, as shown in Fig. 25. Upon the side of the lower jaw and near its rear end is arranged a metal strip 179, having a notch 179ª in its lower side, adapted to be engaged by a dog 180, which is pivoted at 181 to a bracket 171, below the vice. This dog is normally held in a vertical position by a spring 182, which is connected to the free end of the dog and extends rearwardly to a bracket 171, below the vise. This dog is normally held against a stop 184, on the bracket, by said spring. When the vise is in its rearmost position, the dog 180 extends in front of the strip 179, as shown in Fig. 25. In this position, the wire $s^2$ to form the staple is gripped within the notch 170 in the vise and is cut off, and the vise then moves forward to the position shown in Fig. 26, to carry the wire length to the stapling mechanism. During this movement, the strip 179 on the lower vise jaws rock the dog 180 forward and when the vise has completed its forward movement, as illustrated in Fig. 26, the dog 180 is in engagement with the notch $179^a$. The wire length is then in position to be acted upon by the staple guides, as shown in Fig. 29. The staple guides then descend and bend the wire into a U-shape over the lower jaw $v$ of the vise, as shown in Figs. 27 and 30, and the wire is pressed into the grooves in the staple guides. The lower jaw of the vise thus serves as an anvil for the bending of the wire into the form of a staple. The downward pressure on the forward end of the lower jaw by the staple guides during this bending operation causes the rear end of said jaw to be thrown upward, thus releasing the dog 180, from the notch $179^a$, and the dog is immediately drawn against its stop 184 and held in the vertical position by the spring 182. As soon as the wire length has been doubled into U-form by the staple guides, the vise starts to recede and the movements of the staple guides and the vise are so timed that when the jaws pass from between the staple guides, the staple will be left in its uppermost position within the guides, as shown in Fig. 31. After the vise has passed out of line with the staple guides and the pressure is taken off of the lower jaw, the latter is rocked by the spring 177 and the notched strip 179 drops on to the upper end of the dog 180, which holds the lower jaw in open position while the vise is moving backward, as shown in Fig. 28, and until the vise has nearly completed its movement when the strip 179 rides beyond the dog and this allows the lower jaw to close against the wire which has been fed forward during the return movement of the vise. While the vise is moving backward, after having delivered a wire length to the stapling mechanism, the staple guides continue downward, as shown by the relation of the parts in Fig. 28, and during the downward movement the staple is applied to the wisp and given its final form and driven into the brush block, as heretofore described.

The operation is as follows: Normally the brush tables are in the forwardly inclined position, and the roller 61, on the lever 62 rests upon the detent 205 on the cam wheel 49, as illustrated in Fig. $16^a$. A block to be bored is placed upon the table $c$, and a block which has previously been bored on the table $c$ is placed on the table $c'$. The operator then pulls the table frame forwardly, so that the detent can spring out of line with the roller on the lever 62, and then allows the table frame to be pulled backwardly by the weight until said roller rests on the low part of the cam 49. In this position of the tables, the forward ends of the brush blocks are beneath the boring tool and stapling mechanism and are inclined so that the holes bored and tufts set will be inclined with respect to the faces of the brush blocks. The operator then moves the clutch lever to the left, in Fig. 1, until it is engaged by the latch 24, and this movement causes the clutch shaft to be connected to the constantly driven shaft 4. The boring and staple driving devices then make a downward and upward movement at each revolution of the clutch shaft, and at each downward movement a hole is bored in one block and a tuft is stapled into a correspondingly located hole in the other block. A step by step movement is given to the cam shaft between successive operations of the boring and stapling devices, and two of the cam wheels 48 and 49, on said shaft, cause the tables carrying the brush blocks to be shifted so as to space the holes and tufts according to a pattern predetermined by the form of the cam surfaces on said cam wheels. Thus, the cam wheel 48, which causes lateral shifting of the brush tables, effects lateral spacing of the holes and tufts, while the cam wheel 49, which rocks the tables forwardly, effects longitudinal spacing of the holes and tufts. The cam wheel 50, which causes vertical movement of the tables adjusts the tables so that the brush blocks, at the points immediately under the drill and staple driving mechanisms will always be at the same height. Prior to each downward movement of the staple guides a wisp of fibre or bristle is brought beneath said guides and a length of wire for forming a staple is carried by the vise into a position over the tuft. The staple is then formed and applied to a tuft and driven into a hole in the brush block by the staple guides and driver, in the manner heretofore fully described. During one complete turn of the cam shaft the tables carrying the brush blocks are rocked step by step from a backwardly inclined position to a forwardly inclined position, and the one block is bored with a full complement of holes while the other block is completely tufted, and near the end of the revolution of the cam shaft, the tappet arm 29 thereon engages the tripping lever 28 which is connected to the latch 24 on the clutch mechanism and this latch is moved to release the locking pin in the clutch and thereby cause stoppage of the machine. The finished brush and the bored block are then removed from the tables and the bored block is placed on the table beneath the stapling devices while an unbored block is placed on the table beneath the boring tool. The operator then pulls the table frame forwardly to allow the detent on the cam 49 to swing out of line with the roller on lever 62, and then allows the table frame to rock back to the starting position in which said roller engages the low part of said cam. The clutch lever is then moved by hand to start the machine and the operations before described are repeated.

What I claim is:

1. In a brush-making machine, the combination with wisp gathering means and wire feeding and cutting means, of staple forming and applying devices comprising a vertically movable slide, a pair of vertically arranged staple guides pivoted thereon and having grooves in their adjacent lower edges to receive a staple, the lower ends of the grooves being inclined toward one another, means co-acting with said guides to form the staples during the first part of the downward movement of the guides, a staple driving rod movable between said guides to drive the staple from said guides into the brush block, and means on the rod for rocking the guides to cause their lower ends to move toward one another, to give an inward set to the staple prongs, then away from one another to permit the staple to be moved freely to the ends of the guides, and then farther away from one another to permit the staple to be driven out of the guides and into the brush block.

2. In a brush-making machine, the combination with a fibre magazine and stapling mechanism, of a reciprocating tufter bar having a notch with relatively fixed jaws, sloping in opposite directions, adapted to gather wisps from the magazine and carry them to said mechanism, said bar comprising two alined parts, and means on the bar for setting said parts at varying distances apart, to vary the width of the notch.

3. In a brush-making machine, the combination with a fiber magazine and staple driving mechanism, of a reciprocating bar having a notch for gathering wisps from the magazine and conveying them to said mechanism, and means for depressing the wisps in the notch as they are carried toward said mechanism comprising upper and lower parallel guides arranged at the sides of said bar, the opposing faces of said guides being below the top of the bar and substantially parallel therewith, and the ends of said upper guides adjacent the magazine having their lower edges inclined upwardly to the magazine.

4. In a brush-making machine, the combination with a fiber magazine and stapling mechanism, of a reciprocating tufter bar having a notch, with relatively fixed jaws, for collecting wisps from the magazine and conveying them to the stapling mechanism, and a stationary member, yieldingly pressed against said bar and extending from the magazine to the stapling mechanism, said member serving as a strick and as a closure for said notch.

5. In a brush-making machine, the combination with wisp-gathering means of stapling mechanism comprising a horizontally reciprocating slide, a vise on said slide comprising an upper jaw fixed to the slide, a lower jaw pivoted to the slide and a spring for closing said jaws, means for delivering a wire length to said jaws in the rearmost position of the slide, vertically movable staple guides adapted to bend the wire over the lower jaw and rock said latter jaw to open position at the end of the forward movement of the slide, and means for holding said lower jaw in open position during the return movement of the slide.

6. In a brush-making machine, the combination with wisp gathering means of stapling mechanism comprising a horizontally reciprocating slide, a vise on said slide comprising an upper jaw fixed to the slide, a lower jaw centrally pivoted to the slide and a spring for closing said jaws, means for delivering a wire length to said jaws in the rearmost position of the slide, vertically movable staple guides adapted to bend the wire over the lower jaw and rock said latter jaw to open position at the end of the forward movement of the slide, and means for holding said lower jaw in open position during the return movement of the slide comprising a dog pivoted to rock in a vertical plane, said dog adapted to engage beneath a part on the rear arm of said lower jaw and raise said arm when the slide moves backwardly and to yield and rock forwardly when the slide moves forward.

7. In a brush-making machine, the combination with wisp gathering means of stapling mechanism comprising a horizontally reciprocating slide, a vise on said slide comprising an upper jaw fixed to the slide, a lower jaw pivoted to the slide and a spring for closing said jaws, means for delivering a wire length to said jaws in the rearmost position of the slide, vertically movable staple guides adapted to bend the wire over the lower jaw and rock said latter jaw to open position at the end of the forward movement of the slide, and means for holding said lower jaw in open position during the return movement of the slide comprising a dog pivoted adjacent the slide and projecting upwardly, a stop for limiting the backward movement of the dog, a spring for holding said dog against the stop, an elongated part on the rear arm of said lower jaw adapted to engage and rock the dog forwardly while the slide is moving forwardly, said part adapted to ride rearwardly on the end of said dog when the slide moves backwardly and to pass off of the pawl in the rearmost position of the slide.

In testimony whereof I affix my signature.

CHARLES E. FISHER.